United States Patent
Wu et al.

(10) Patent No.: US 12,085,484 B2
(45) Date of Patent: Sep. 10, 2024

(54) VIBRATION-CENTRIFUGATION COMPOSITE TEST APPARATUS AND CONTROL METHOD THEREOF

(71) Applicant: SUZHOU SUSHI TESTING GROUP CO., LTD., Suzhou (CN)

(72) Inventors: Yugang Wu, Suzhou (CN); Jiangfeng Zhu, Suzhou (CN); Bin Zhao, Suzhou (CN); Pengfei Ge, Suzhou (CN)

(73) Assignee: SUZHOU SUSHI TESTING GROUP CO., LTD., Suzhou (CN)

(*) Notice: Subject to any disclaimer, the term of this patent is extended or adjusted under 35 U.S.C. 154(b) by 196 days.

(21) Appl. No.: 17/770,615

(22) PCT Filed: Nov. 27, 2019

(86) PCT No.: PCT/CN2019/121221
§ 371 (c)(1),
(2) Date: Apr. 20, 2022

(87) PCT Pub. No.: WO2021/093026
PCT Pub. Date: May 20, 2021

(65) Prior Publication Data
US 2022/0291079 A1    Sep. 15, 2022

(30) Foreign Application Priority Data
Nov. 12, 2019   (CN) .......................... 201911098054.5

(51) Int. Cl.
*G01M 7/02*    (2006.01)
*G01M 7/04*    (2006.01)
*G01M 99/00*   (2011.01)

(52) U.S. Cl.
CPC ............ *G01M 7/025* (2013.01); *G01M 7/045* (2013.01); *G01M 99/00* (2013.01)

(58) Field of Classification Search
CPC ....... G01M 7/025; G01M 7/045; G01M 99/00
(Continued)

(56) References Cited

U.S. PATENT DOCUMENTS

| | | | |
|---|---|---|---|
| 3,699,807 A | 10/1972 | Kerley, Jr et al. | |
| 2002/0077239 A1* | 6/2002 | Evans, III | B04B 13/00 494/7 |

(Continued)

FOREIGN PATENT DOCUMENTS

| | | | |
|---|---|---|---|
| CN | 102506897 A | | 6/2012 |
| CN | 102794235 A | * | 11/2012 |

(Continued)

OTHER PUBLICATIONS

Translation CN-106052995 (Year: 2016).*
(Continued)

*Primary Examiner* — Octavia Hollington
*Assistant Examiner* — Monica S Young
(74) *Attorney, Agent, or Firm* — Cheng-Ju Chiang

(57) ABSTRACT

A vibration-centrifugation composite test apparatus and a control method thereof, the apparatus comprises: a centrifuge, an air-cooled electric vibration table and a control electrical cabinet the air-cooled electric vibration table comprises a vibration table main machine and a fan; a central axis of the moving coil in the vibration table main machine is on the same straight line as a horizontal center line of the rotation arm in the centrifuge; the fan is a horizontal fan and disposed above the center of the rotation arm, and a fan cover cabinet is mounted outside the horizontal fan; the control electrical cabinet is mounted above the fan cover cabinet, a power supply line of the control electrical cabinet is connected to a power supply through the conductive slip (Continued)

ring, and a vibration feedback signal line of the vibration table main machine is directly connected to the control electrical cabinet.

9 Claims, 4 Drawing Sheets

(58) Field of Classification Search
USPC .......................................................... 73/577
See application file for complete search history.

(56) References Cited

U.S. PATENT DOCUMENTS

2005/0079064 A1* 4/2005 Shimizu .................. B04B 9/146
494/9
2017/0080422 A1* 3/2017 Maaskant .......... B01D 17/0217

FOREIGN PATENT DOCUMENTS

| | | | | | |
|---|---|---|---|---|---|
| CN | 102901646 | A | * | 1/2013 | |
| CN | 104075863 | A | | 10/2014 | |
| CN | 205426463 | U | * | 8/2016 | |
| CN | 106052995 | A | * | 10/2016 | ............. G01M 7/02 |
| CN | 205642778 | U | * | 10/2016 | |
| CN | 205861316 | U | * | 1/2017 | |
| CN | 106706245 | A | * | 5/2017 | |
| CN | 107024329 | A | * | 8/2017 | ............. G01M 7/02 |
| CN | 107941444 | A | | 4/2018 | |
| CN | 105149199 | B | * | 5/2018 | |
| CN | 210571266 | U | | 5/2020 | |
| CN | 113701970 | A | * | 11/2021 | |
| CN | 114061873 | A | * | 2/2022 | |
| JP | 2002-257670 | A | | 9/2002 | |
| WO | WO-2019146415 | A1 | * | 8/2019 | ............. B04B 13/00 |

OTHER PUBLICATIONS

Translation CN-106706245 (Year: 2017).*
Translation _CN107024329 (Year: 2017).*
Translation CN114061873 (Year: 2022).*
Translation CN-102901646 (Year: 2013).*
Translation CN-105149199 (Year: 2018).*

* cited by examiner

VIBRATION-CENTRIFUGATION COMPOSITE TEST APPARATUS AND CONTROL METHOD THEREOF

CROSS REFERENCE TO RELATED APPLICATIONS

The present application is a 35 U.S.C. § 371 National Phase conversion of International (PCT) Patent Application No. PCT/CN2019/121221, filed on Nov. 27, 2019, which claims priority to Chinese Patent Application No. 201911098054.5, filed with the China National Intellectual Property Administration on Nov. 12, 2019 and entitled "Vibration-centrifugation Composite Test Apparatus and Control Method Thereof", the content of which is incorporated herein by reference in its entirety. The PCT International Patent Application was filed and published in Chinese.

TECHNICAL FIELD

The present invention relates to the field of a composite mechanics environment test apparatus, and particularly to a vibration-centrifugation composite test apparatus and a control method thereof.

BACKGROUND

A vibration-centrifugation composite test apparatus can achieve composite tests of vibration and centrifugal acceleration. A vibration-acceleration composite action is a typical working environment of inertia product devices, and occurs in both a take-off phase and a reentry phase of an aircraft.

The Chinese patent application CN201410347486.6 discloses a vibration-centrifugation composite test apparatus, comprising a centrifuge and an air-cooled electrical vibration table; the centrifuge comprises a base, a rotation arm and a driving device; the air-cooled electrical vibration table comprises a main machine and a fan; an electrical brush is disposed at a rotation center of the rotation arm; the main machine of the vibration table is disposed above a load end of the rotation arm; the fan is disposed on an middle section of the rotation arm; the main machine of the vibration table is connected to the electrical brush via a conductor wire group fixed on the rotation arm, and is powered on via the electrical brush and inputs and outputs a control signal.

It is discovered in actual use that the vibration-centrifugation composite test apparatus with this structure has the following drawbacks: the main machine of the vibration table is disposed above the load end of the rotation arm; since a direction of the centrifugal force received by the table body of the main machine of the vibration table is higher than a central plane of the rotation arm, a centrifugal moment is generated and prone to damage the rotation arm and the main machine of the vibration table.

In addition, a method of controlling the conventional vibration-centrifugation composite test apparatus employs two sets of control systems, namely, a vibration control system and a rotation control system, which are independent on each other. Upon operation, the two sets of control systems need to be manually started respectively. Such an operation is extremely complicated and prone to cause mis-operation and a very low control precision.

For the above reasons, there are purposefully provided a vibration-centrifugation composite test apparatus which is structurally more reasonable, and a control method exhibiting a high control reliability and precision.

SUMMARY

A main technical problem solved by the present invention is to provide a vibration-centrifugation composite test apparatus and a control method thereof. The apparatus exhibits a more reasonable structure and a high reliability, is comprehensively controlled by one control system, is convenient to operate and can improve the control precision.

In order to solve the above technical problems, the present invention employs the following technical solution: there is provided a vibration-centrifugation composite test apparatus, comprising: a centrifuge, an air-cooled electric vibration table and a control electrical cabinet;

the centrifuge comprises a base, a rotation arm is horizontally disposed on the base, and a middle portion of the rotation arm is connected relative to the base and rotatable about a vertical line direction; a driving device acts on the rotation arm to drive the rotation arm to rotate relative to the base;

the air-cooled electric vibration table comprises a vibration table main machine and a fan, and the fan is connected with the vibration table main machine through an air duct;

the rotation arm comprises a set of main beams arranged in parallel, one end of the set of main beams serves as a load end, a counterweight serving as a balance end is disposed at the other end, and a conductive slip ring is disposed in an interior of a rotation center of the rotation arm;

the vibration table main machine is disposed inside the load end of the rotation arm, a moving coil is disposed in the vibration table main machine, the moving coil vibrates in a horizontal direction, and a central axis of the moving coil is on the same straight line as a horizontal center line of the rotation arm; the fan is a horizontal fan and disposed above the center of the rotation arm, and a fan cover cabinet is mounted outside the horizontal fan;

the control electrical cabinet is mounted above the fan cover cabinet, a power supply line of the control electrical cabinet is connected to a power supply through the conductive slip ring, and a vibration feedback signal line of the vibration table main machine is directly connected to the control electrical cabinet.

In a preferred embodiment of the present invention, the vibration table main machine comprises a moving coil, an excitation magnetic circuit, an upper cover and a lower cover, wherein the moving coil is floatingly supported in the excitation magnetic circuit, and the upper cover and the lower cover are respectively fixed and mounted on both ends of the excitation magnetic circuit.

In a preferred embodiment of the present invention, the upper cover is barrel-shaped, a set of air inlets are symmetrically provided on side walls near the moving coil table top, an air outlet is disposed on the lower cover, and the air outlet is connected to the air duct.

In a preferred embodiment of the present invention, the horizontal fan comprises a support frame, a housing mounted on the support frame, and a motor mounted on the housing, wherein a suction port is disposed on the housing and connected to the air duct.

In a preferred embodiment of the present invention, the rotation arm comprises a set of main beams, a plurality of cross plates connected between the main beams, mounting plates disposed above a middle portion of the main beams, and cover plates disposed above the main beams and located on both sides of the mounting plates.

In a preferred embodiment of the present invention, a mounting table is further mounted inside the middle portion of the main beams, a central hole is provided at a center of the mounting table, and a plurality of screw holes are evenly distributed in a circumferential direction of the central hole.

In a preferred embodiment of the present invention, the cross plates are each provided with a through hole, and the air duct transversely passes through the through holes.

In a preferred embodiment of the present invention, the driving device comprises a motor and a transfer gear box, an output shaft of the motor is connected to the transfer gear box, and an output shaft of the transfer gear box is connected to the rotation arm.

In order to solve the above technical problems, the present invention employs the following another technical solution: a method of controlling the vibration-centrifugation composite test apparatus, an acceleration sensor being mounted on the moving coil, a rotation speed sensor being disposed on the driving device, a central control module being built in the control electrical cabinet;

the central control module is connected to the acceleration sensor and the rotation speed sensor through a programmable gate array unit, an analog-to-digital conversion module and a conditioning circuit module are arranged in turn between the programmable gate array unit and the acceleration sensor, and between the programmable gate array unit and the rotation speed sensor, and the central control module processes and outputs a signal for controlling an acceleration target waveform of the current in the excitation magnetic circuit and the moving coil, and a signal for controlling a frequency of an AC power supply of the motor;

the control method comprises the following steps:

Step 1: the acceleration sensor collects a current acceleration value of the moving coil table top in real time at a first collection frequency and generates an acceleration induction analog signal, the acceleration induction analog signal representing information that the real-time acceleration value of the moving coil table top changes with time;

Step 2: the rotation speed sensor collects a current rotation speed value of the motor in real time at a second collection frequency and generates a rotation speed induction analog signal, the rotation speed induction analog signal representing information that the real-time rotation speed value of the motor changes with time;

Step 3: convert the acceleration induction analog signal from the acceleration sensor and the rotation speed induction analog signal from the rotation speed sensor into an acceleration voltage signal and a rotation speed voltage signal respectively through two conditioning circuit modules;

Step 4: convert the acceleration voltage signal and the rotation speed voltage signal from the two conditioning circuit modules into an acceleration digital signal and a rotation speed digital signal after being sampled by an analog-to-digital conversion module, respectively, the two conditioning circuit modules employing the same sampling frequency;

Step 5: the programmable gate array unit calculates a current acceleration value of the moving coil table top and a current rotation speed value of the motor respectively according to the acceleration digital signal and the rotation speed digital signal;

Step 6: the central control module compares the current acceleration value of the moving coil table top and the current rotation speed value of the motor from the programmable gate array unit with an acceleration target value curve and a rotation speed target value curve, respectively, and generates a modified acceleration drive digital signal and a modified rotation speed drive digital signal;

Step 7: the acceleration drive digital signal and the rotation speed drive digital signal from Step 6 respectively control a corresponding power amplifier, and then drive the excitation magnetic circuit, the moving coil and the motor.

In a preferred embodiment of the present invention, the current acceleration value of the moving coil table top and the current rotation speed value of the motor in the step 6 are connected to a display through an output port, so that the acceleration and rotation speed information of the vibration-centrifugation composite test apparatus is displayed in real time on a time coordinate system of the display.

Advantageous effects of the present invention are as follows: in the present invention the vibration table main machine is disposed inside the load end of the rotation arm, so that the central axis of the moving coil in the vibration table main machine and the moving coil table top is on the same straight line as a center line of the rotation arm, namely, a direction of a centrifugal force received by the vibration table main machine is on a central plane of the rotation arm, without causing a centrifugal moment, thereby eliminating the influence of the centrifugal moment on the rotation arm and the vibration table;

Meanwhile, the fan employs a horizontal fan mounted above the rotation center of the rotation arm. Furthermore, the fan cover cabinet is disposed outside the fan so that the fan receives a small centrifugal force and is not prone to damages;

In addition, the control electrical cabinet is mounted above the fan cover cabinet, and a vibration feedback signal line (weak current) of the vibration table is directly connected to the control electrical cabinet above the rotation arm not through an electrical brush (the conductive slip ring), thereby avoiding the interference of strong current to the vibration control signal due to the simultaneous passage of the weak current line and the power supply line (strong current line) through the conductive slip ring, thereby improving the vibration control precision;

In addition, the control method employed by the present invention integrates vibration control and vibration control so that the systems are comprehensively controlled by one control system, the reliability and precision are improved, the acceleration and rotation speed with different sampling frequencies are displayed by one coordinate system of one display, both the vibration system and the vibration system can be controlled, various running states can be displayed on the interface, and operation and control are facilitated.

Components in the figures are denoted by the following numerals:

1. Centrifuge, 11. Base, 12. Rotation arm, 121. Main beam, 122. Cross plate, 123. Mounting plate, 124. Cover plate, 125. Counterweight, 126. Vibration table main machine mounting block, 127. Mounting table, 13. Motor, 14. Transfer gearbox, 15. Conductive slip ring;

2. Air-cooled electric vibration table, 21. Vibration table main machine, 211. Moving coil, 2111. Moving coil table top, 212. Excitation magnetic circuit, 213. Upper cover, 2131. Air inlet, 214. Lower cover, 2141. Air outlet, 22. Fan, 221. Support frame, 222. Housing, 2221. Suction port, 223. Motor, 23. Air duct, 24, Fan cover cabinet;

3. Control electrical cabinet.

DETAILED DESCRIPTION

Preferred embodiments of the present invention will be illustrated in detail with reference to the figures to make advantages and features of the present invention more apparent to those skilled in the art, thereby defining the protection scope of the present invention more clearly and definitely.

Figure 1:
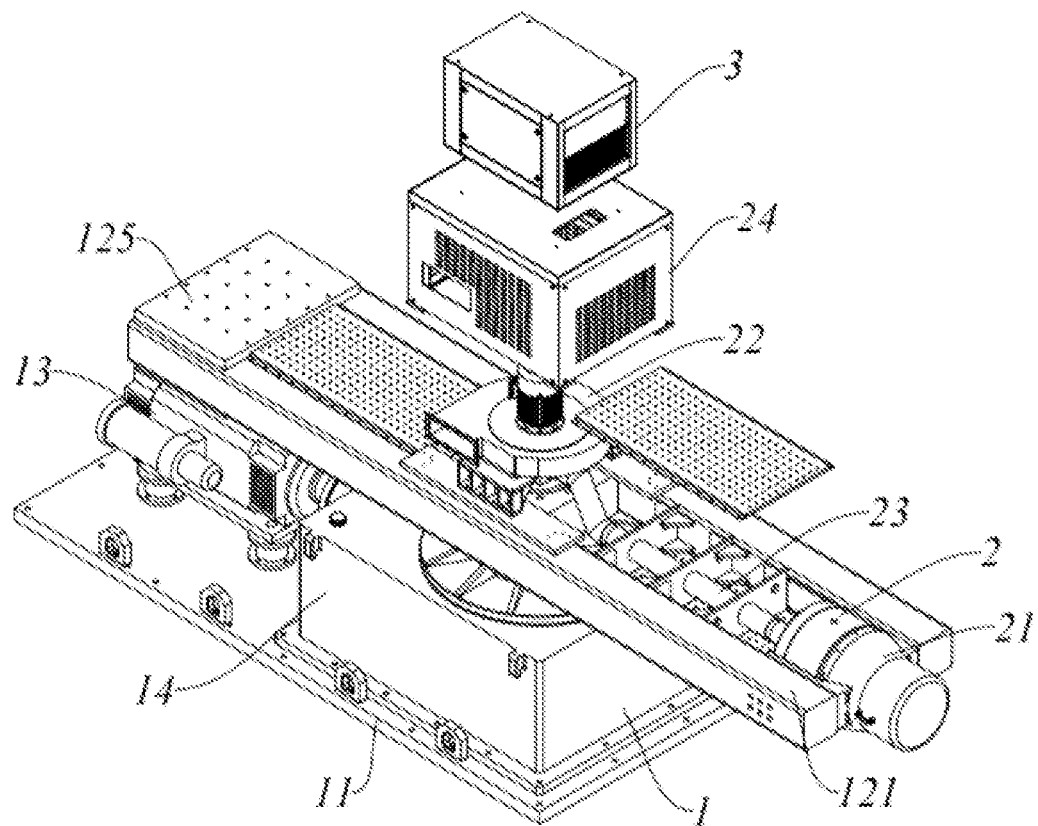
FIG. 1 is a perspective view of a preferred embodiment of a vibration-centrifugation composite test apparatus according to the present invention.
Figure 2:
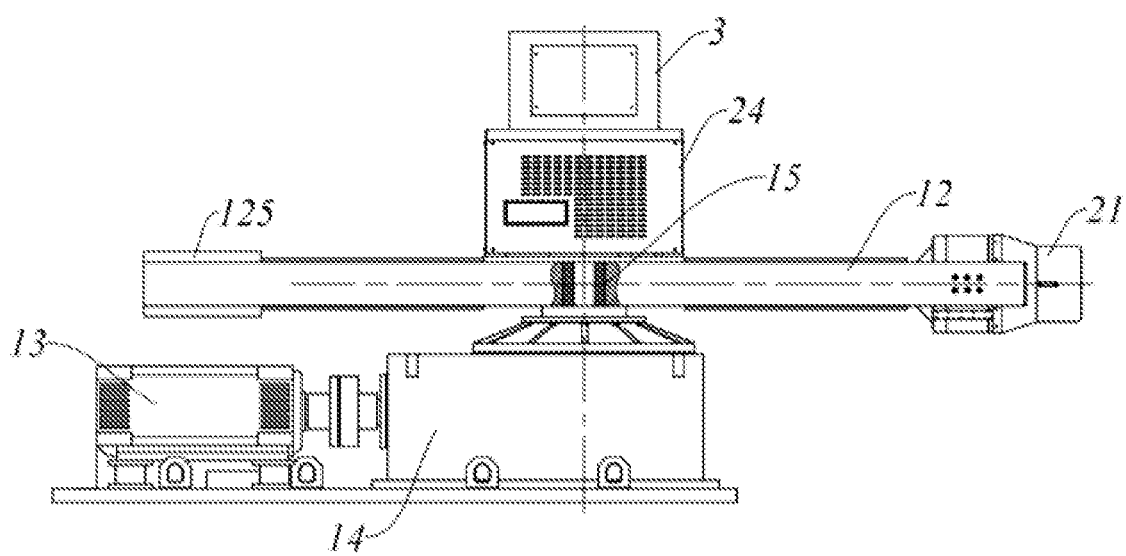
FIG. 2 is a front view of a preferred embodiment of a vibration-centrifugation composite test apparatus according to the present invention.
Figure 3:
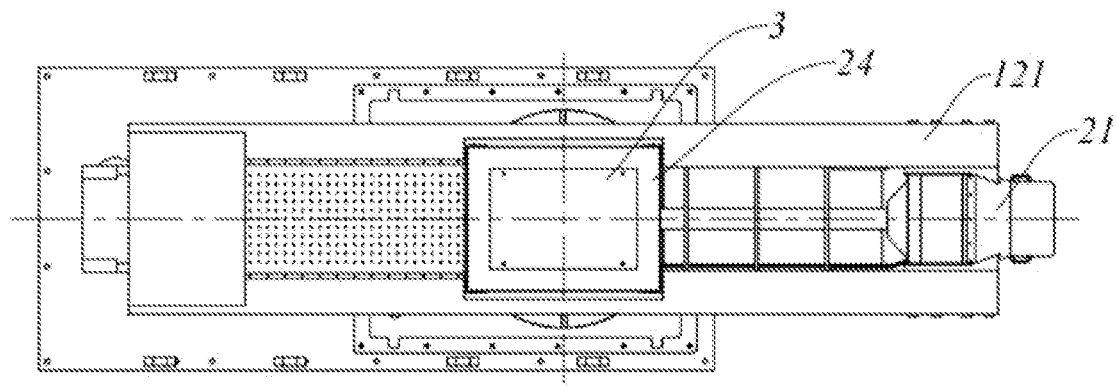
FIG. 3 is a top view of a preferred embodiment of a vibration-centrifugation composite test apparatus according to the present invention.
Figure 4:
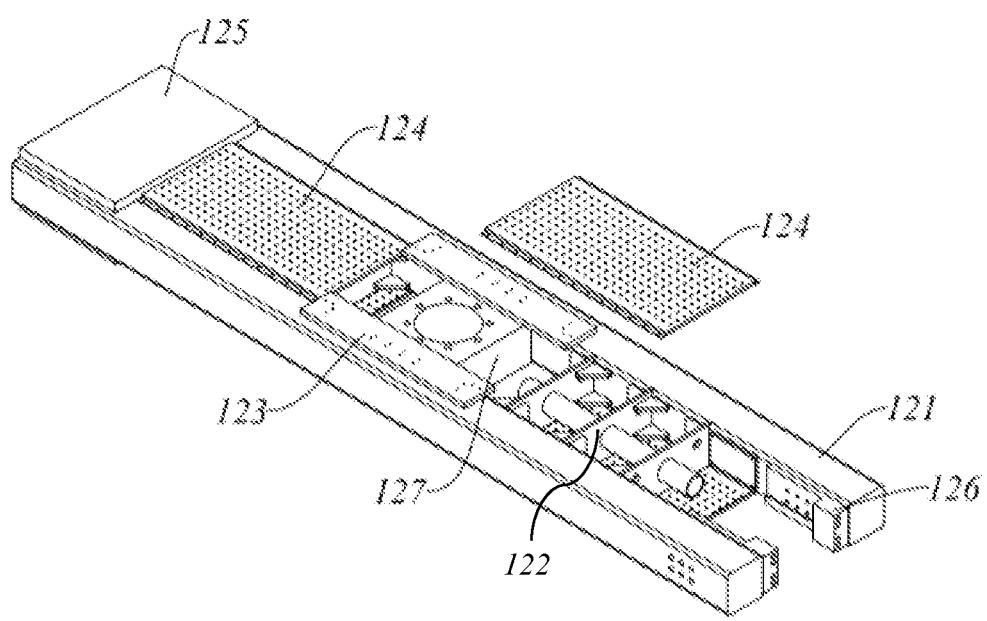
FIG. 4 is a structural schematic view of a rotation arm shown in FIG. 1.

Referring to FIG. 1 through FIG. 3, the present invention comprises:

a vibration-centrifugation composite test apparatus, comprising: a centrifuge 1, an air-cooled electric vibration table 2 and a control electrical cabinet 3; the centrifuge 1 comprises a base 11, a rotation arm 12 is horizontally disposed on the base 11, and a middle portion of the rotation arm 12 is connected relative to the base 11 and rotatable about a vertical line direction; a driving device acts on the rotation arm 12 to drive the rotation arm 12 to rotate relative to the base 11; in the present embodiment, the driving device comprises a motor 13 and a transfer gear box 14, an output shaft of the motor 13 is connected to the transfer gear box 14, and an output shaft of the transfer gear box 14 is connected to the middle portion of the rotation arm 12 to drive the rotation arm 12 to rotate; the air-cooled electric vibration table 2 comprises a vibration table main machine 21 and a fan 22, and the fan 22 is connected with the vibration table main machine 21 through an air duct 23;

Turning to FIG. 4, the rotation arm 12 comprises a set of main beams 121 arranged in parallel, a plurality of cross plates 122 welded or screwed between the main beams 121, mounting plates 123 welded or screwed above the middle portion of the main beams 121, and cover plates 124 detachably mounted on both sides of the mounting plates 123; one end of the set of main beams 121 is used as a load end, vibration table main machine mounting blocks 126 are fixed in the load end by screws, the other end of the set of main beams 121 is a balance end, a counterweight 125 is mounted in the balance end, a mounting table 127 is further mounted inside the middle portion of the set of main beams 121, a central hole is provided at a center of the mounting table 127, a plurality of screw holes are evenly distributed in a circumferential direction of the central hole, and a conductive slip ring 15 is mounted in the central hole. Specifically, the screws pass through the screw holes located in the circumferential direction of the central hole to fix the conductive slip ring 15 in the center hole, the cross plates 122 are each provided with a through hole, and the air duct 23 transversely passes through the through holes to connect the vibration table main machine 21 with the fan 22.

In the present embodiment, the vibration table main machine mounting blocks 126 are L-shaped and symmetrically fixed on an inner side of the load end, and the vibration table main machine 21 is limited and fixed between the two L-shaped vibration table main machine mounting blocks 126, so that a central axis of a moving coil 211 in the vibration table main machine 21 is on the same straight line as a horizontal center line of the rotation arm 12, namely, a center line of the set of main beams 121, i.e., a direction of a centrifugal force received by the vibration table main machine 21 is on a central plane of the rotation arm 12, thereby eliminating the influence of a centrifugal moment on the rotation arm 12 and the vibration table main machine 21.

Figure 5:
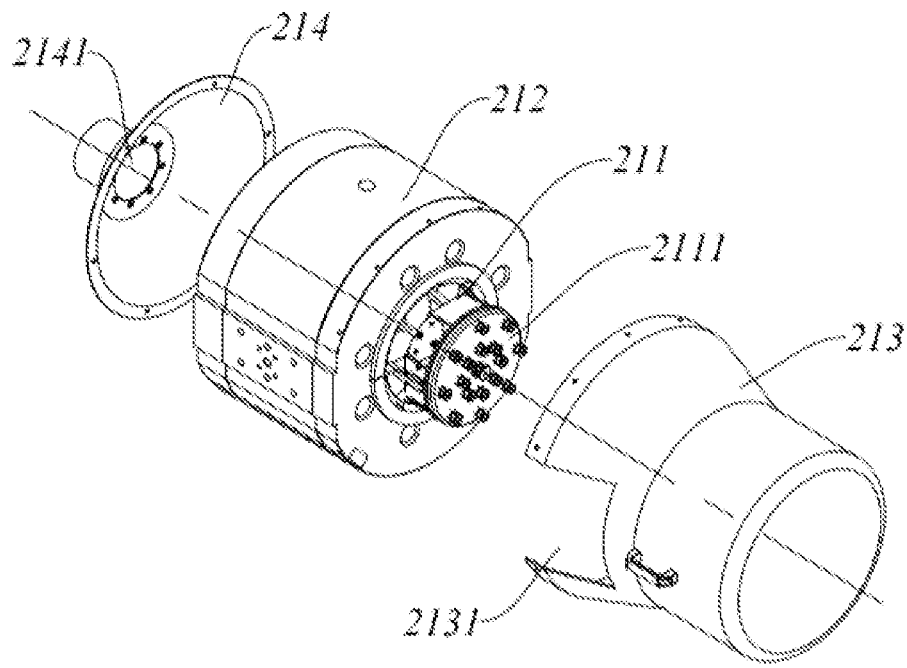
FIG. 5 is a structural schematic view of a main machine of the vibration table shown in FIG. 1.

Turning to FIG. 5, the vibration table main machine 21 comprises a moving coil 211, an excitation magnetic circuit 212, an upper cover 213 and a lower cover 214, wherein the moving coil 211 is floatingly supported in the excitation magnetic circuit 212 and vibrates in a horizontal direction of the rotation arm 12, and the upper cover 213 and the lower cover 214 are respectively fixed and mounted on both ends of the excitation magnetic circuit 212; in the present embodiment, the upper cover 213 is barrel-shaped and can cover a test piece on a moving coil table top 2111 to catch small parts thrown out when the rotation arm 12 rotates at a high speed, thereby avoiding the occurrence of accidents. A set of air inlets 2131 are symmetrically provided on side walls near the moving coil table top 2111, an air outlet 2141 is disposed on the lower cover 214, and the air outlet 2141 is connected to the air duct 23.

Figure 6:
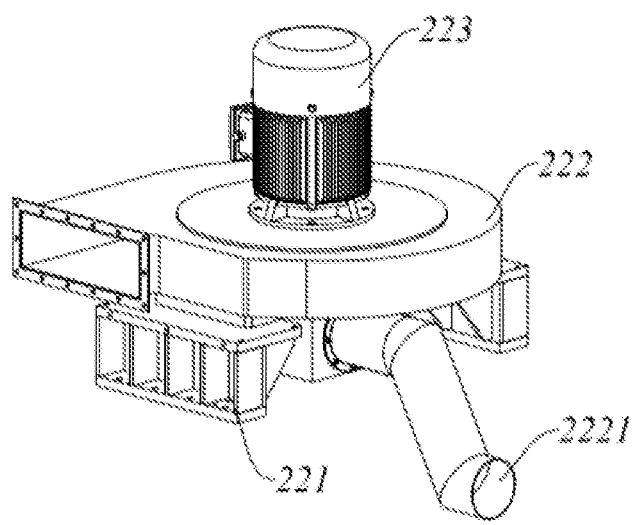
FIG. 6 is a structural schematic view of a fan shown in FIG. 1.

Turning to FIG. 6, the fan 22 is a horizontal fan and mounted on the mounting plates 123 at the middle portion of the rotation arm 12, and a fan cover cabinet 24 is also mounted outside the horizontal fan specifically, the horizontal fan; comprises a support frame 221, a housing 222 mounted on the support frame 221, and a motor 223 mounted on the housing 222. A suction port 2221 is disposed on the housing 222 and connected to the air duct 23. The horizontal structure of the fan reduces the height of the fan so that fan can be mounted at a central portion of the rotation arm 12. Furthermore, the fan cover cabinet 24 is mounted outside the fan for protection so that the fan receives a smaller centrifugal force and is not prone to damages.

Further referring to FIG. 1, the control electrical cabinet 3 is mounted above the fan cover cabinet 24, a power supply line of the control electrical cabinet 3 is connected to the power supply through the conductive slip ring 15, the power source of the vibration table main machine 21 and the fan 22 is provided by the control electrical cabinet 3, and a vibration feedback signal line of the vibration table main machine 21 is directly connected to the control electrical cabinet 3, that is, the vibration feedback signal line (weak current) of the vibration table main machine 21 is not arranged through the conductive slip ring 15 simultaneously with the power supply line (strong current), thereby avoiding the interference of strong current to the vibration control signal.

Figure 7:
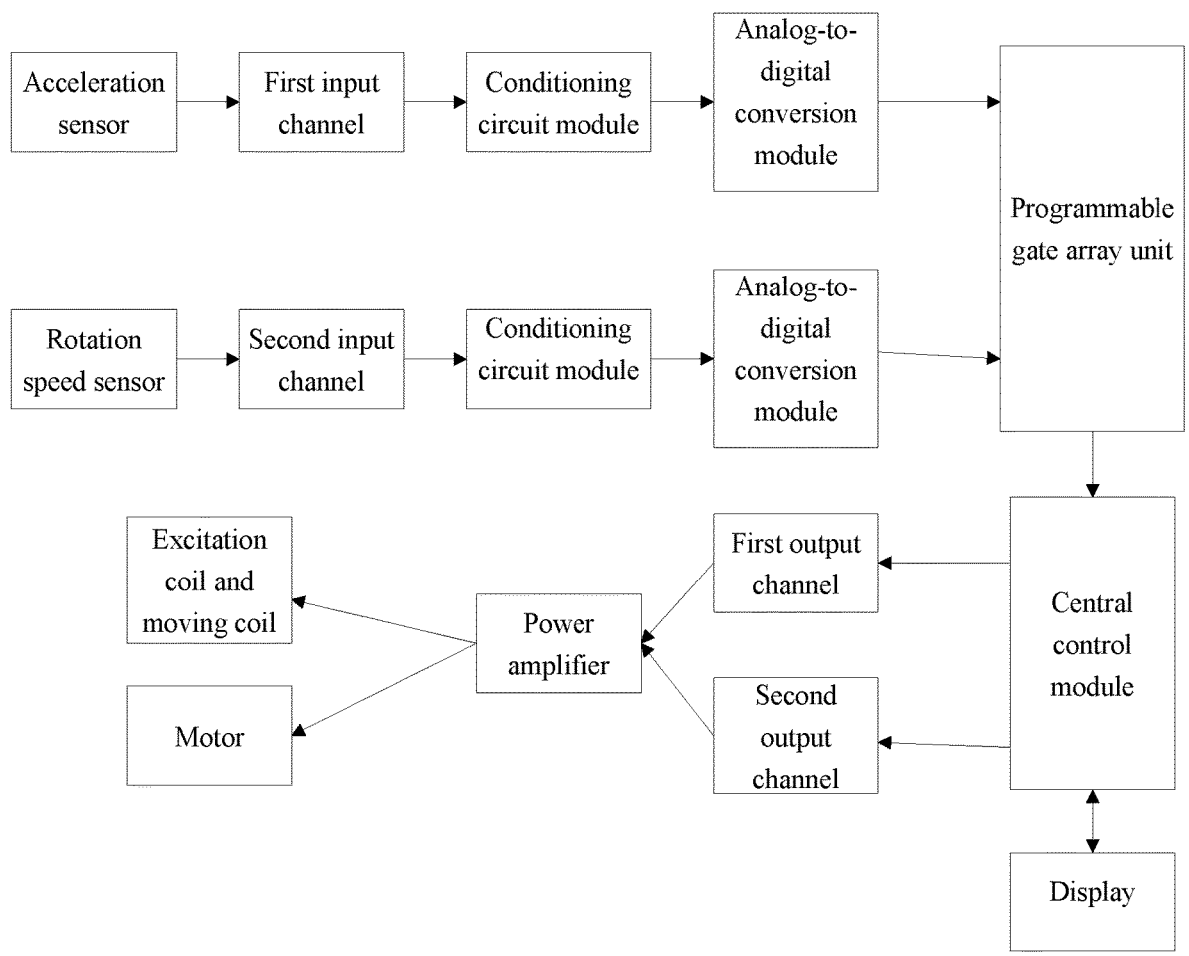
FIG. 7 is a schematic diagram shown the principle of a control method of the vibration-centrifugation composite test apparatus according to the present invention.

In addition, in order to facilitate the control of the vibration-centrifugation composite test apparatus of the present invention and improve its centrifugation and vibration control accuracy, the present invention employs a method of controlling the vibration-centrifugation composite test apparatus. Specifically, an acceleration sensor is mounted on the moving coil 211, a rotation speed sensor is mounted on the driving device (the motor 13), and a central control module is built in the control electrical cabinet 3 in the present embodiment;

As shown in FIG. 7, the central control module is connected to the acceleration sensor and the rotation speed sensor through a programmable gate array unit, an analog-to-digital conversion module and a conditioning circuit module are arranged in turn between the programmable gate array unit and the acceleration sensor, and between the programmable gate array unit and the rotation speed sensor, and the central control module processes and outputs a signal for controlling an acceleration target waveform of the current in the excitation magnetic circuit and the moving coil, and a signal for controlling a frequency of an AC power supply of the motor;

The control method comprises the following steps:

Step 1: the acceleration sensor collects a current acceleration value of the moving coil table top in real time at a first collection frequency and generates an acceleration induction analog signal, the acceleration induction analog signal representing information that the real-time acceleration value of the moving coil table top changes with time;

Step 2: the rotation speed sensor collects a current rotation speed value of the motor in real time at a second collection frequency and generates a rotation speed induction analog signal, the rotation speed induction analog signal representing information that the real-time rotation speed value of the motor changes with time;

Step 3: Convert the acceleration induction analog signal from the acceleration sensor and the rotation speed induction analog signal from the rotation speed sensor into an acceleration voltage signal and a rotation speed voltage signal respectively through two conditioning circuit modules;

Step 4: Convert the acceleration voltage signal and the rotation speed voltage signal from the two conditioning circuit modules into an acceleration digital signal and a rotation speed digital signal after being sampled by an analog-to-digital conversion module, respectively, the two conditioning circuit modules employing the same sampling frequency;

Step 5: the programmable gate array unit calculates a current acceleration value of the moving coil table top and a current rotation speed value of the motor respectively according to the acceleration digital signal and the rotation speed digital signal;

Step 6: the central control module compares the current acceleration value of the moving coil table top and the current rotation speed value of the motor from the programmable gate array unit with an acceleration target value curve and a rotation speed target value curve, respectively, and generates a modified acceleration drive digital signal and a modified rotation speed drive digital signal;

Step 7: the acceleration drive digital signal and the rotation speed drive digital signal from Step 6 respectively control a corresponding power amplifier, and then drive the excitation magnetic circuit, the moving coil and the motor.

Wherein, the current acceleration value of the moving coil table top and the current rotation speed value of the motor in the step 6 are connected to a display through an output port, so that the acceleration and rotation speed information of the vibration-centrifugation composite test apparatus is displayed in real time on a time coordinate system of the display.

To conclude, the present invention has a more reasonable structure and high reliability, and enables the apparatus to be comprehensively controlled by one control system, so that the operation is convenient and the control precision can be improved.

In the description of the present invention, it should be appreciated that the orientation or positional relationship indicated by terms such as "up", "down", "left", "right", "in" and "out" etc. is the orientation or positional relationship based on the drawings, or the orientation or positional relationship in which the product according to the present invention is customarily placed upon use, and does not indicate or imply that the specified means or elements must have a specific orientation and are constructed and operated with a specific orientation, and therefore cannot be construed as limiting the present invention. What are described above are only preferred embodiments of the present invention and are not used to limit the present invention. For those skilled in the art, the present invention may have various modifications and changes. Any modifications, equivalent replacements, improvements, etc. made within the spirit and principle of the present invention all should be included in the protection scope of the present invention.

What are described above are only embodiments of the present invention, and are not intended to limit the scope of the present invention. Any equivalent structure or equivalent process variations made by using the content of the description and drawings of the present invention, or direct or indirect applications to other related technical fields are likewise all included in the extent of protection of the present invention.

What is claimed is:

1. A vibration-centrifugation composite test apparatus, comprising:
a centrifuge, an air-cooled electric vibration table and a control electrical cabinet; wherein
the centrifuge comprises a base, a rotation arm is horizontally disposed on the base, and a middle portion of the rotation arm is connected relative to the base so that the rotation arm is rotatable about a vertical direction line extending through the middle portion; a driving device acts on the rotation arm to drive the rotation arm to rotate relative to the base;
one end of the rotation arm serves as a load end, a counterweight serving as a balance end is disposed at the other end, and a conductive slip ring is disposed in an interior of a rotation center of the rotation arm;
a vibration table main machine in the air-cooled electric vibration table is disposed inside the load end of the rotation arm, a moving coil is disposed in the vibration table main machine, the moving coil vibrates in a horizontal direction, and a central axis of the moving coil is on the same straight line as a horizontal center line of the rotation arm;
the control electrical cabinet is mounted above the rotation center of the rotation arm, a power supply line of the control electrical cabinet is connected to a power supply through the conductive slip ring, and a vibration feedback signal line of the vibration table main machine bypasses the conductive slip ring and is directly connected to the control electrical cabinet;
wherein the air-cooled electric vibration table comprises the vibration table main machine and a fan, the fan is connected with the vibration table main machine through an air duct and is mounted at the middle portion of the rotation arm;

wherein the rotation arm comprises a set of main beams, a plurality of cross plates connected between the main beams, each of the cross plates is provided with a through hole, and the air duct transversely passes through the through holes; and wherein the air duct is connected to the vibration table main machine along the horizontal direction.

2. The vibration-centrifugation composite test apparatus according to claim 1, wherein the fan is a horizontal fan and disposed above the rotation center of the rotation arm, and a fan cover cabinet is mounted outside the horizontal fan; and the control electrical cabinet is mounted above the fan cover cabinet.

3. The vibration-centrifugation composite test apparatus according to claim 2, wherein the horizontal fan comprises a support frame, a housing mounted on the support frame, and a motor mounted on the housing, and a suction port is disposed on the housing and is bent downwards relative to the housing to be connected to the air duct.

4. The vibration-centrifugation composite test apparatus according to claim 1, wherein the vibration table main machine comprises a moving coil, an excitation magnetic circuit, an upper cover and a lower cover, the moving coil is floatingly supported in the excitation magnetic circuit, and the upper cover and the lower cover are respectively fixed and mounted on both ends of the excitation magnetic circuit.

5. The vibration-centrifugation composite test apparatus according to claim 4, wherein the upper cover is barrel-shaped, a set of air inlets are symmetrically provided on side walls near a moving coil table top, an air outlet is disposed on the lower cover, and the air outlet is connected to the air duct.

6. The vibration-centrifugation composite test apparatus according to claim 1, wherein mounting plates are disposed above a middle portion of the main beams, and cover plates are disposed above the main beams and located on both sides of the mounting plates, one of the cover plates is placed above the air duct.

7. The vibration-centrifugation composite test apparatus according to claim 6, wherein a mounting table is further mounted inside the middle portion of the main beams, a central hole is provided at a center of the mounting table, and a plurality of screw holes are evenly distributed in a circumferential direction of the central hole.

8. The vibration-centrifugation composite test apparatus according to claim 1, wherein the driving device comprises a motor and a transfer gear box, an output shaft of the motor is connected to the transfer gear box, and an output shaft of the transfer gear box is connected to the rotation arm.

9. The vibration-centrifugation composite test apparatus according to claim 1, wherein a pair of vibration table main machine mounting blocks are fixed in the load end, the vibration table main machine mounting blocks are L-shaped and symmetrically fixed on an inner side of the load end, and the vibration table main machine is limited and fixed between the two L-shaped vibration table main machine mounting blocks.

* * * * *